(12) United States Patent
Stauder et al.

(10) Patent No.: US 8,154,559 B2
(45) Date of Patent: Apr. 10, 2012

(54) MAPPING METHOD ALONG ANCHORED MAPPING TRAJECTORIES WITH IMPROVED UNIFORMITY

(75) Inventors: Jurgen Stauder, Montreuil/Ille (FR); Djibril Coulibaly, Chevilly la Rue (FR); Laurent Blonde, Thorigne-Fouillard (FR)

(73) Assignee: Thomson Licensing, Boulogne, Billancourt (FR)

( * ) Notice: Subject to any disclaimer, the term of this patent is extended or adjusted under 35 U.S.C. 154(b) by 546 days.

(21) Appl. No.: 12/313,489

(22) Filed: Nov. 20, 2008

(65) Prior Publication Data

US 2009/0141041 A1    Jun. 4, 2009

(30) Foreign Application Priority Data

Nov. 27, 2007 (EP) .................................. 07301595

(51) Int. Cl.
*G09G 5/02* (2006.01)
*H04N 1/60* (2006.01)

(52) U.S. Cl. .......... 345/590; 345/591; 345/593; 358/1.9

(58) Field of Classification Search ........................ None
See application file for complete search history.

(56) References Cited

U.S. PATENT DOCUMENTS 5,933,253 A * 8/1999 Ito et al. ................... 358/500
2008/0080767 A1 * 4/2008 Cho et al. ................. 382/167

OTHER PUBLICATIONS

Gamut Mapping Using Variable Anchor Points, Chae-Soo Lee, Kyeong-Joo Lee, and Yeong-Ho Ha, Jan. 1999.*
Three-Dimensional Gamut Mapping Using Various Color Difference Formulae and Color Spaces, Naoya Kaoh, Masahiko Ito, Oct. 1999.*

* cited by examiner

*Primary Examiner* — Kee M Tung
*Assistant Examiner* — Michelle Chin
(74) *Attorney, Agent, or Firm* — Jeffrey D. Carter

(57) ABSTRACT

In the different mapping planes, described by plane coordinates, of the color space in which colors to map are represented, a uniformity testing curve can be found that intersects all mapping trajectories of this mapping plane and, at any intersection of a mapping trajectory with said uniformity testing curve, the gradients calculated in said plane coordinates of the intersecting mapping lines and the first derivation along this uniformity testing of these gradients are continuous.

Thank to the invention, colors are better preserved after mapping, even if there are different mapping methods in the same mapping plane.

3 Claims, 3 Drawing Sheets

MAPPING METHOD ALONG ANCHORED MAPPING TRAJECTORIES WITH IMPROVED UNIFORMITY

This application claims the benefit, under 35 U.S.C. §119, of European Patent Application No. 07301595.0 of 27 Nov. 2007.

BACKGROUND OF THE INVENTION

1. Field of the Invention

The invention relates to a method of mapping a set of source colors of a source color device into a set of target colors of a target color device.

2. Description of the Invention

Gamut mapping is used to reproduce an image rendered by a source color device on a target color device, since the source device and the target device typically have different gamut boundaries with respect to each other. In other words, the gamut of colors that can be reproduced by the source device is typically not the same as the gamut of colors that can be reproduced by the target device. Gamut mapping can be used to render the image from within the source device gamut boundary to within the target device gamut boundary, so as to more accurately reproduce the color image on the target device.

The term "color gamut" or "gamut" is generally used to describe the complete range of colors an image contains or a color device is able to render. It is sometimes referred to as a color gamut or the gamut color space associated, for instance, with a printer or screen display device. Gamut mapping an image for instance onto a screen or printer generally requires adjusting the colors of the image to fit in the constrained color gamut of the screen or printer. In some cases, the image being displayed does not have a wide range of colors and therefore does not fill or utilize the wider range of colors in the printer gamut or even the screen gamut. New technologies in capturing and displaying wide gamut images and new standards for wide gamut color encoding raise the question of compatibility between today's (legacy) content distribution channels and upcoming wide gamut content creation, distribution and display.

A color gamut may contain all colors that can be reproduced by a specific display or printing device or that can be transmitted or stored when using for instance a specific medium or standard. A color gamut can also be used to characterize all colors that occur in an image or in a video. Cameras, palm tops, cell phones, Internet terminals and digital picture frames generate images using specific color gamuts in YCC, Adobe RGB, bgRGB, scRGB, CIELAB, e-sRGB or ROMM digital representations.

Gamut mapping of image data from a source color gamut to a target color gamut is typically performed using a gamut mapping algorithm ("GMA"), which is a particular method of mapping color data between gamuts. A gamut mapping algorithm often makes use of data that defines the boundaries of the color gamut of the source and the target color devices, in order to obtain a reference between the two gamuts for appropriate gamut mapping of the image. Such data defining the gamut color boundary can be referred to as a gamut boundary description ("GBD"). See for instance US2007/081176.

Gamut mapping is generally performed in a device-independent color space. A very usual device-independent mapping color space is the CIE L*a*b* space. For utmost perceptual comprehensibility, the gamut mapping may also be performed in the CIE L*C*h color space. Directly in connection with the color perception by the eyes, the color may be represented by three attributes, namely the lightness representing the color lightness, the chroma representing the color brightness and the color hue representing the color type. In relation with the previous L*a*b* color space, the chroma C* is calculated according to the formula $C^*=\sqrt{a^{*2}+b^{*2}}$. The higher the C* value, the more saturated is the color. The hue h is calculated according to the formula h=arctan(b/a). Gamut mapping algorithms are generally build according to specific criterion, as, for instance, the preservation of the hue, or the preservation of the contrast, or the preservation of the saturation of colors, or the preservation of the colorimetric color reproduction. The gamut mapping procedure has generally to be optimized with respect to these criteria.

Instead of performing the gamut mapping in the 3D L*C*h color space, the generally accepted practice is to perform gamut mapping in a two-dimensional plane of lightness L and chroma C, with the color hue h being kept constant. Such a gamut mapping method is then hue-preserving. For each source color having a given hue, the mapping of this source color is performed in a L*C* plane comprising all the colors having the same hue. Instead of using in L*C* space, other two-dimensional spaces can be used, for example xy color space as defined by the CIE.

Gamut mapping algorithms that are very common map colors along mapping trajectories that are anchored to an anchor point, in the mapping color space. These mapping trajectories are generally straight lines. The anchor points generally belong to the achromatic axis (or "grey line") of the color space. These anchor points can be chosen according to the shape of the source and destination gamuts such as described, for instance, by Montag and Fairchild in their paper entitled "Gamut mapping: Evaluation of chroma clipping techniques for three destination gamuts", published in 1998 at the IS&T/SID Sixth Color Imaging Conference in Scottsdale. The way how the color is moved along such mapping trajectories can be various. Simple mapping algorithms clip all colors that are outside the target gamut onto the target gamut surface along the mapping trajectories. More complex mapping algorithms compress linearly all colors along the mapping trajectories by linear scaling such that they keep on the same mapping trajectories but are all inside the destination gamuts. Still more complex, non-linear parametric functions apply specific, sometimes piece-wise defined scaling operations to the colors to move them along the defined lines inside the target gamut. For example, Braun and Fairchild suggest in their publication entitled "Image Lightness Rescaling Using Sigmoidal Contrast Enhancement Functions" published in 1999 in the Proceedings of SPIE Electronic Imaging Conference (Eli99) a non-linear, S-shaped function. When mapping colors from a source gamut into a destination gamut, the above cited papers use mapping straight lines, variable anchor points and mapping functions that define how far a color on a mapping straight line needs to be moved. The mapping trajectories, the anchor points and the mapping functions can be fixed or adapted to the source and target gamut boundaries in a given mapping color space.

The mapping color space, being 3D as L*a*b* or L*C*h, or being 2D as L*C*, may also be partitioned into a plurality of color sub-spaces, each sub-space having its own gamut mapping algorithm to be apply to the source colors belonging to this color sub-space. For example, when using gamut mapping algorithms based on compression or extension along mapping trajectories anchored to anchor points as mentioned above, the mapping color space may be divided into three regions, a first region of minimum lightness, a second region of maximum lightness and a third region of intermediate lightness; in the first region, source colors will be mapped according to straight lines that are all anchored to a same first anchor point; in the second region, source colors will be mapped according to straight lines that are all anchored to a same second anchor point; and in the third region, source colors will be mapped according to straight lines that are anchored to different and variable anchor points. The article entitled "Parametric gamut mapping algorithms using variable anchor points", published by Chae-Soo LEE, Chae-Hee LEE and Yeong-Ho HA, in Journal of Imaging Science and Technology, volume 44, number 1, page 68-89 (January-February 2000) gives an example of such a mapping method. Other mapping methods using different gamut mapping algorithms depending on the mapping color regions are disclosed in U.S. Pat. No. 5,933,253, in the article entitled "Gamut mapping in Munsell constant hue sections", published by Gabriel MARCU during the sixth "Color Imaging Conference: Color Science, Systems, and Applications", pp. 159-162.

The problem that rises when mapping using different gamut mapping algorithms according the partitions or regions of the mapping color space is the uniformity of the global mapping method, mainly across two partitions. Moreover, the method using variable anchor points does not have generally a smooth behavior in terms of uniformity. Such non-uniformities may create false contour defects.

In the article entitled "On the Continuity of Gamut Mapping Algorithms", Peter Zolliker, Markus Dätwyler and Klaus Simon proposes a method to evaluate the uniformity of a global mapping method: first, two direct neighbored colors (or RGB value triplets) are transformed by a color management chain including gamut mapping. The distance between the two mapped neighbored colors (triplets) statistically analyzed over a large set of color pairs is a first criterion of uniformity. Second, a color and a circumscribing unit sphere is mapped in Lab space by gamut mapping. The volume, surface, maximum and minimum diameter of the mapped sphere statistically analyzed over a large set of colors is the second criterion of uniformity.

An object of the invention is to improve the uniformity of the gamut mapping in order, notably, to limit the false contour defects that may be associated with a lack of uniformity.

SUMMARY OF THE INVENTION

For this purpose, the subject of the invention is a method of mapping, in a mapping color space, source colors of a source color device into target colors of a target color device, wherein:

each source color is mapped into its target color along a mapping trajectory that is anchored to an anchor point, wherein said mapping trajectory belongs to a mapping plane comprising said anchor points, there is at least one mapping plane comprising said anchor points, in which the different mapping trajectories do not intersect one with another except, possibly, at said anchor points, in which all source colors that lies on a mapping trajectory are mapped along said mapping trajectory, and in which a plurality of mapping trajectories can be found that are anchored to different "variable" anchor points, and wherein, in said at least one mapping plane, a uniformity testing curve different from an achromatic axis can be found that intersects all mapping trajectories of this mapping plane such that:

the function defined by the variation, along said uniformity testing curve, of the gradients of these mapping trajectories at said intersections is continuous, the first derivation of said function along this uniformity testing curve is also continuous.

It has to be noted that, in FIG. 9 (*a*) of the above-quoted article entitled "Parametric gamut mapping algorithms using variable anchor points", if we define a testing curve as a vertical straight line with C*≠0, intersecting all mapping trajectories of the L*C* mapping plane, the function defined by the variation, along this vertical straight line, of the slopes, i.e. the gradients, of the mapping trajectories at said intersections is continuous, but the first derivation of this function along the vertical straight line is not continuous at the boundaries between the different partitions or mapping regions. In this document, according of the different regions, the mapping is performed using fixed anchor points (central region of medium Lightness) or is performed using mapping trajectories with constant slope (region of high or low Lightness).

Preferably, said at least one mapping plane is partitioned into several parts, at least one part with priority in contrast preservation, and at least another part with priority in saturation preservation. Thank to the invention, colors are better preserved after mapping, even if there are different mapping methods in the different parts of a given mapping plane.

Preferably, each of said gradients of mapping trajectories at said intersections with the uniformity testing curve is defined as the value of the first derivation of the function describing, in its mapping plane, a mapping trajectory at the intersection of said mapping trajectory with said uniformity testing curve.

Mapping trajectories can be straight lines, but other types of curves can be used. Other types include curves defined by rational non-linear functions, exponential functions, mathematical parametric closed functions in general, functions defined by numerical data, or any other type of curves. Other types of curves such as polygons and general non-linear curves are also possible as mapping trajectories. Since these curves have more degrees of freedom than a straight line, they can be optimized with respect to a set of criteria including human visual system and a specific target device. For example, the curves may be denser in regions where the human eye perceives more color differences or the target color device has better resolution in the mapping color space.

The invention provides an advantageous alignment of the different mapping trajectories of the same mapping plane that is adapted to improve the uniformity of the mapping. The continuity of gradients of mapping trajectories, and the continuity of their first derivatives along a uniformity testing curve, are used as a criterion for this alignment, because this continuity of gradients and the continuity of their first derivatives along a uniformity testing curve indicate whether the mapping trajectories are homogeneous in a neighborhood in color space.

This invention offers a solution for gamut mapping that

Uses variable anchor points in order to conserve in general the maximum of contrast;

Excludes anchor points of extreme (low and high) lightness in order to preserve saturation of dark and light colors;

Ensures smoothness of gradients of mapping curves and thus

Preserves the colorimetric relation between neighboring colors by mapping neighbored colors along similar curves.

The invention has at least three following advantages with respect to known gamut mapping methods:

Overall contrast is better preserved;
Saturation of dark and light colors is better preserved;
Colorimetric relation of neighboring colors is better preserved.

BRIEF DESCRIPTION OF THE DRAWINGS

The invention will be more clearly understood on reading the description which follows, given by way of non-limiting example and with reference to the appended figures in which.

DESCRIPTION OF THE PREFERRED EMBODIMENTS

Figure 2:
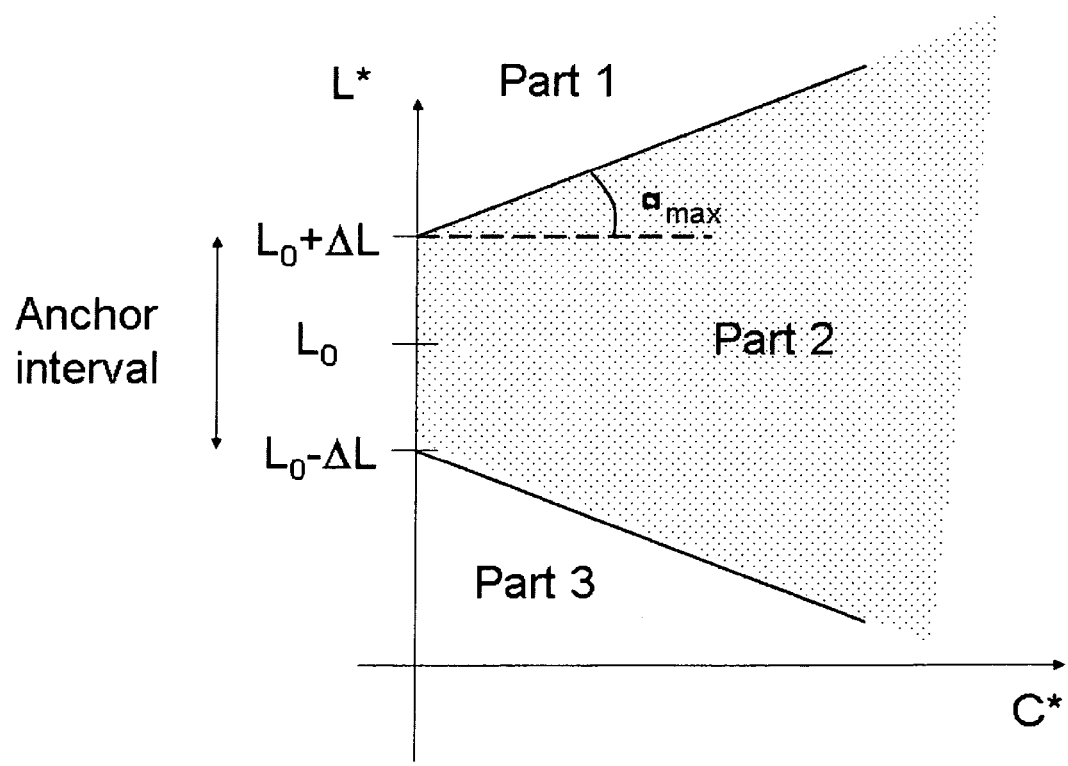
FIG. 2 illustrates the partition of the L*C* mapping plane of FIG. 1.

An non-limiting embodiment of a mapping method according to the invention will now be explained, in which the mapping color space is the CIE L*C*h, already mentioned. The achromatic axis of this color space corresponds to the lightness axis, i.e. the line C=0, h=0. Source colors of a source color device have to be mapped into target colors of a target color device. A source gamut is associated with the source color device, giving the entire range of colors that can be rendered or captured by this source color device. Similarly, a target gamut is associated with the target color device, giving the entire range of colors that can be rendered or captured by this target color device: FIG. 2 represents such a target gamut. Each source color is mapped into its target color along a mapping trajectory that is anchored to an anchor point. The mapping trajectories are straight lines. All anchor points belongs to the achromatic axis. All source colors are mapped along mapping lines that belongs to a plane comprise this source color and the achromatic axis. It means that the mapping is not carried out in 3D L*C*h color space but in 2D L*C* color planes. The mapping method is then hue-preserving. All source colors lying on a mapping line are mapped along this mapping line.

Figure 1:
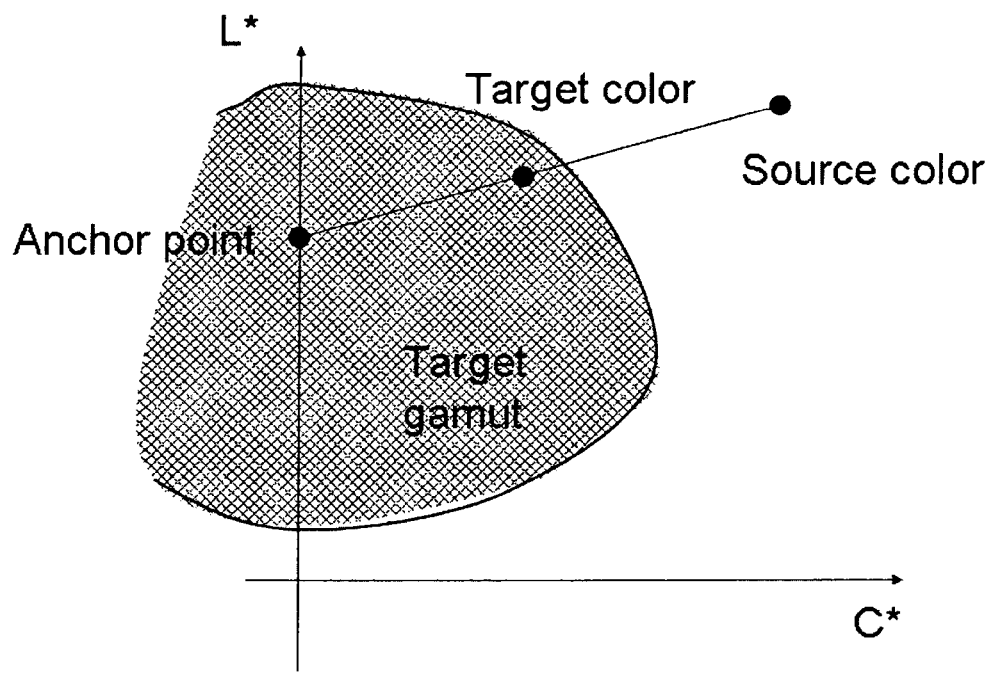
FIG. 1 illustrates the mapping, within a given L*C* mapping plane, of a source color into a target color located inside the target gamut, along a mapping line anchored to anchor point, according to an embodiment of the invention.

In this exemplary embodiment of the invention, straight lines are used as mapping trajectories along which source colors are mapped to target colors. Any source color JCh to be mapped is defined by its values L,C in a given L*C* mapping color plane of constant hue h. The definition of the mapping of this source color requires the definition of different partitions in this L*C* mapping color plane, the definition of a mapping line, the definition of an anchor point, and the definition of a compression/extension algorithm along this mapping line. As shown in FIG. 1, any source color can be mapped along its mapping line in a way that the corresponding target color is inside the target gamut.

Definition of the Partitions of the L*C* Mapping Color Plane:

The partitioning of the L*C* mapping color plane is the pre-processing step for the calculation of mapping lines that belong to this plane. The idea is to simplify the mapping line calculation task and to more easily define a gamut mapping that conserves in general the maximum of contrast and that preserves saturation of dark and light colors.

FIG. 2 shows a solution for L*C* color plane partition. Three parts are defined in this plane: part 1, part 2 and part 3. They are separated by straight lines since straight lines are used as mapping trajectories. If mapping trajectories are of other type, the parts are separated by curves of the same type as used for mapping trajectories.

Part 2 is the main part of the L*C* color plane. In this part, the maximum of contrast is to be preserved. Part 2 is defined by a so-called anchor interval on the lightness axis of size 2 $\Delta L$ centered around $L_0$ as well as by an angle $\alpha_{max}$ between the upper border of this part and a line $L=L_0+\Delta L$ that is parallel to the chroma axis. Part 2 is symmetric in lightness direction with respect to the line $L=L_0$ parallel to the chroma axis. Part 2 is an open region for the high C* values.

Parts 1 and 3 contain colors of high and low luminance, respectively. In this part, saturation is to be preserved as much as possible. In parts 1 and 3, saturation is—even before mapping—naturally not very strong for two reasons. First, parts 1 and 3 are delimited by respectively the upper border of part 2 with a positive slope and the lower border of part 2 with a negative slope, already described. By this, colors of high saturation are in part 2 as shown in FIG. 1. Second reason is the typical shape of color gamuts that are usually convex and do not contain highly saturated colors with very high or very low luminances (see FIG. 2 for an example of a gamut).

Reasonable values for $L_0$, $\Delta L$ and $\alpha_{max}$ are 50, 30 and 70 degrees, respectively. $L_0$ and $\Delta L$ may also be derived from the shape of a gamut. For example, $L_0$ is chosen as luminance where the gamut has its largest chroma and $\Delta L$ is chosen with respect of the distance between $L_0$ and the luminance limits, for example $\Delta L=\max\{L_0; 100-L_0\}$. $\alpha_{max}$ may also be determined with respect to a gamut, for example as a function of $\Delta L$.

Starting Definition of Anchor Points in the Different Parts of the Mapping Plane L*C* (see FIGS. 3 and 4):

The anchor point is an important characteristic of the gamut mapping algorithm since it determines the overall mapping direction. Variable anchor points are used in part 2 in order to conserve in general the maximum of contrast. Fixed anchor points are in parts 1 and 3 in order to preserve saturation of dark and light colors.

Figure 3:
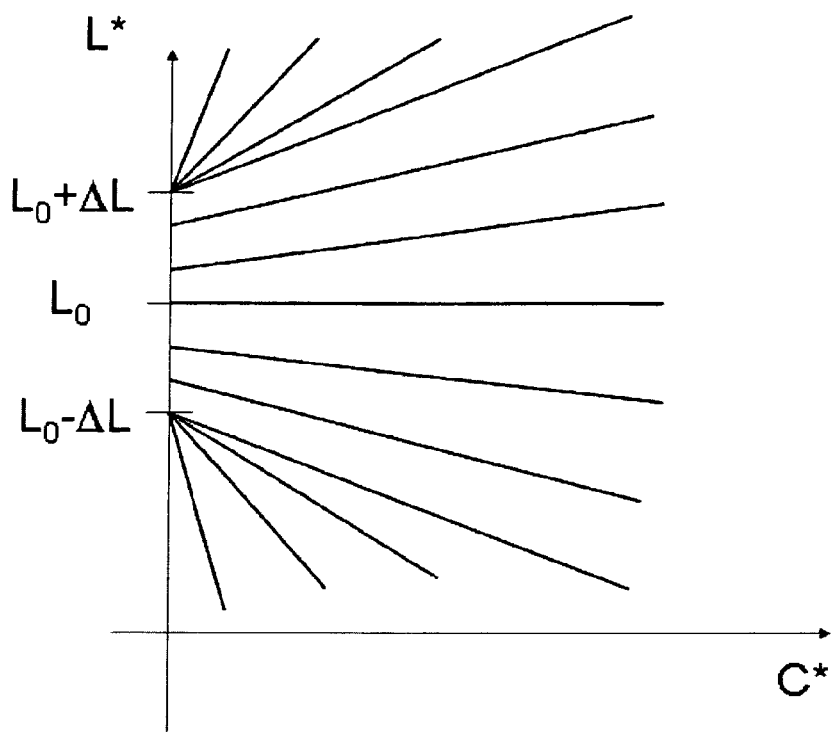
FIG. 3 illustrates different mapping lines belonging to the L*C* mapping plane of FIG. 1, that are differently anchored according to the partition of FIG. 2.

The anchor points are first defined in reference to FIG. 3 as follows:

For source colors in part 1, the anchor point is always at $L_0+\Delta L$;

For source colors in part 2, the anchor point is variable and chosen between $L_0-\Delta L$ and $L_0+\Delta L$; therefore, in the L*C* mapping plane, a plurality of mapping lines can be found that are anchored to different variable anchor points.

For source colors in part 3, the anchor point is always at $L_0-\Delta L$.

Part 1 contains bright colors having a high lightness and low to medium saturation or chroma. Choosing an anchor point at $L_0+\Delta L$ has the effect that the direction of mapping will have a strong component in lightness direction and a smaller component in chroma direction. The visible effect of the mapping will then be a reduction of lightness but few changes in saturation or chroma.

Part 3 contains dark colors having a low lightness and low to medium saturation or chroma. In a way comparable to the processing in part 1, the visible effect of the mapping will be an increase of lightness but few changes in saturation or chroma. The overall impression of mapping of source colors in parts 1 and 3 is that the contrast is reduced but the saturation is preserved.

Part 2 contains colors of medium luminance and low, medium and high saturation. The choice of anchor points on the anchor interval on the L* axis between $L_0-\Delta L$ and $L_0+\Delta L$ has the effect that the direction of mapping will have a small component in lightness direction and a larger component in chroma direction. The visible effect of the mapping will be a reduction of saturation or chroma but few changes in contrast. Definition of Mapping Lines and of Anchor Points in the Different Parts of the Mapping Plane L*C* (See FIGS. 3 and 4):

One aim of the gamut mapping method is to ensure the smoothness of gradients of mapping curves in the mapping color space and thus to preserve the calorimetric relation between neighbouring colors by mapping neighbored colors along similar mapping trajectories.

The uniformity of the global mapping inside the L*C* mapping color plane of constant hue h can be first achieved by the following characteristics:

inside the L*C* mapping color plane, mapping lines do not intersect with other mapping lines.

All colors lying on a mapping curve are mapped along this curve.

Each anchor point belonging to part 2 has a single mapping line associated.

This means that all source colors that lie on this mapping line are mapped along this mapping line.

To define the mapping line of a source color to be mapped, the intersection of this mapping line with the lightness axis, i.e. the anchor point of this mapping line, and the gradient of the mapping line have to be determined. For any color having L, C coordinates in the L*C* mapping color plane, the position $L_{\acute{a}}$ of the anchor points on the lightness axis is defined as follows:

$$L_{\acute{a}} = \begin{cases} L + \Delta L & L \geq L_0 + \Delta L + f_{max} \cdot C \\ L - C \cdot k \cdot (L-L_0)^r & \text{if } L_0 - \Delta L - f_{max} \cdot C \leq L < L_0 + \Delta L + f_{max} \cdot C \\ L - \Delta L & L < L_0 - \Delta L - f_{max} \cdot C \end{cases}$$

where:
the coefficient r is defined as follows:

$$r = \pm \frac{\Delta L + f_{max} \cdot C_0}{f_{max} \cdot C_0};$$

the coefficient k is defined as follows:

$$k = \pm \frac{f_{max}}{(\pm \Delta L \pm f_{max} \cdot C_0)^r},$$

the coefficient $f_{max}$ is defined in the condition 3 below;
the sign +/− is positive for $L>L_0$ and negative for $L<L_0$.

Figure 4:
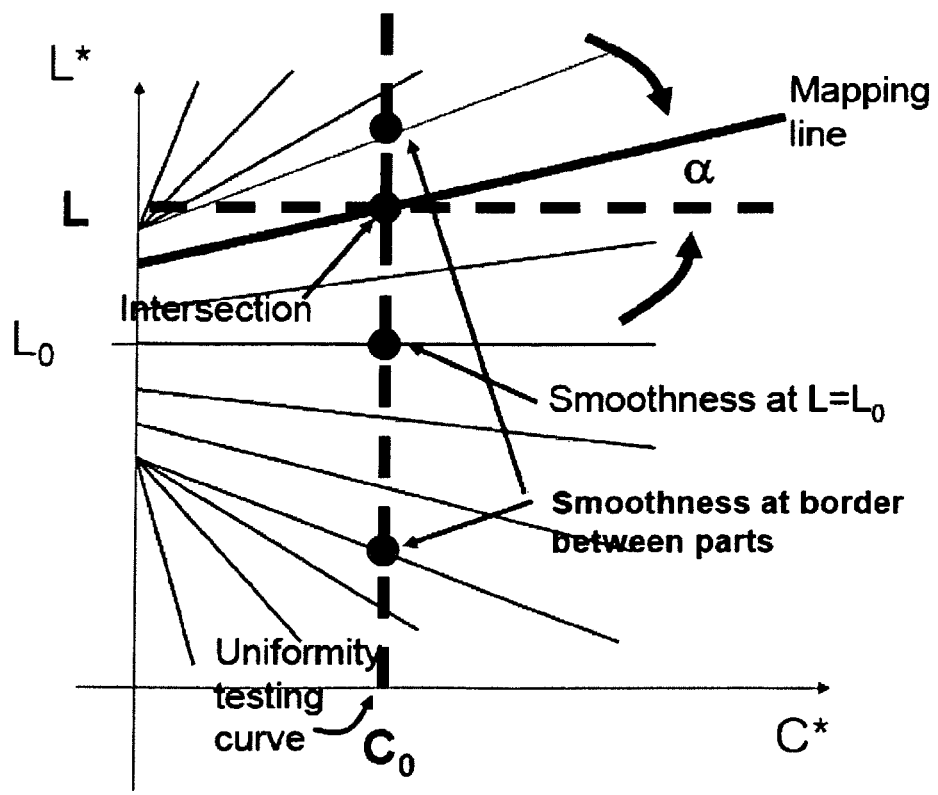
FIG. 4 illustrates the continuity of the gradient of their derivatives at the intersections of a uniformity testing curve with the different mapping lines of FIG. 3.

According to the invention, as shown on FIG. 4, a uniformity testing curve is found as a vertical straight line of constant chroma $C=C_0$, that intersects all mapping trajectories of the L*C* mapping plane. The mapping lines are then defined such that, along this uniformity testing curve, the gradients of the intersecting mapping lines and the first derivation of these gradients are continuous, such gradients and first derivation of these gradients being defined as follows:

the value of such gradient at any intersection of a given mapping line with this uniformity testing curve is defined as equal to the tangent of the angle α between the normal to this uniformity testing curve at this intersection and the tangent of this given mapping line at the same intersection; this gradient is then calculated as follows:

$$\tan\alpha = \begin{cases} \dfrac{L-L_0-\Delta L}{C} & L \geq L_{\acute{a}} + \Delta L + f_{max} \cdot C \\ k \cdot (L-L_0)^r & \text{if } L_{\acute{a}} - \Delta L - f_{max} \cdot C \leq L < L_{\acute{a}} + \Delta L + f_{max} \cdot C \\ \dfrac{L-L_0+\Delta L}{C} & L < L_{\acute{a}} - \Delta L - f_{max} \cdot C \end{cases}$$

the value of such first derivation of gradient at any intersection of a given mapping line with this uniformity testing curve is defined as the derivation of the gradient along said uniformity testing curve; here, as this uniformity testing curve is parallel to the L* axis, such a derivation is calculated according to the variable L.

According to the invention, these gradients and the first derivation of these gradients along the uniformity testing curve fulfil the following conditions:

1—Smoothness at $L=L_0$: $\tan\alpha|_{L=L_{\acute{a}}}=0$;

2—Smoothness at $$L = L_0: \frac{\partial}{\partial L}\tan\alpha \bigg|_{L=L_{\acute{a}}} = 0;$$

3—Smoothness at border between part 2 and part 1, and between part 2 and part 3 of the mapping plane: $\tan\alpha|_{L=L_{\acute{a}}\pm\Delta L\pm f_{max}\cdot C_0}=\pm f_{max}$, where the sign +/− is positive for $L>L_0$ and negative for $L<L_0$, respectively.

4—Smoothness at border between part 2 and part 1, and between part 2 and part 3 of the mapping plane:

$$\frac{\partial}{\partial L}\tan\alpha \bigg|_{L=L_{\acute{a}}\pm\Delta L\pm f_{max}\cdot C_0} = \pm\frac{1}{C_0},$$

where the sign +/− is positive for $L>L_0$ and negative for $L<L_0$, respectively.

The coefficients r and k have been previously defined. By these coefficients, the conditions 1-4 are fulfilled and the gradients of the mapping curves along the test line $C=C_0$ are continuous up to the first derivation.

In order to proof this, conditions 3 and 4 are verified in the following:

Condition 3 is verified as follows:

$$\tan\alpha|_{L=L_{\acute{a}}\pm\Delta L\pm f_{max}C_0} = k(L-L_0)^r|_{L=L_{\acute{a}}\pm\Delta L\pm f_{max}C_0} = \\ \pm\frac{f_{max}(\pm\Delta L\pm f_{max}C_0)^r}{(\Delta L\pm f_{max}C_0)^r} = \pm f_{max}$$

Condition 4 is verified as follows for $L=L_{\dot{a}}+\Delta L+f_{max}C_0$; $C=C_0$ at the border between part 1 and part 2. First, the derivation is calculated:

$$\frac{\partial}{\partial L}\tan\alpha = \begin{cases} \dfrac{1}{C} & L \geq L_{\dot{a}} + \Delta L + f_{max}C \\ rk(L-L_0)^{r-1} & \text{if } L_{\dot{a}} - \Delta L - f_{max}C \leq L < L_{\dot{a}} + \Delta L + f_{max}C \\ \dfrac{1}{C} & L < L_{\dot{a}} - \Delta L - f_{max}C \end{cases}$$

and the condition 4 is proved by showing that:

$$\lim_{\substack{L \to L_{\dot{a}}+\Delta L+f_{max}C \\ L<L_{\dot{a}}+\Delta L+f_{max}C}} \frac{\partial}{\partial L}\tan\alpha =$$

$$\pm\frac{f_{max}}{(\Delta L+f_{max}C_0)^r} \cdot \frac{\Delta L+f_{max}C_0}{f_{max}C_0}(\Delta L+f_{max}C_0)^{r-1} = \frac{1}{C_0}$$

Mapping—Definition of a Compression/Extension Algorithm Along the Mapping Lines:

As shown in FIG. 1, any source color is mapped along its mapping line in a way that the corresponding target color is inside the target gamut.

In this last step of the definition of the gamut mapping method, each source color is mapped onto a target color in direction to the above defined anchor point. The mapping of a source color can be described as a modification of the distance D of this source color from the anchor point into a distance D' of the target color from the same anchor point. Any known algorithm can be used for this mapping.

In the already mentioned paper of Montag and Fairchild, four mapping techniques are described: scaling-clipping, knee-function mapping, Gentile's mapping, and three segment mapping.

The three segment mapping is used in this embodiment, based on a one-dimensional function mapping of D to D' using three segments:

a first segment having a slope of one,
a last segment being a hard clipping, and
a middle segment connecting the other two segments.

The mathematic formula for this one-dimensional function is:

$$D' = \begin{cases} D & 0 \leq D \leq D_{inflection} \\ \dfrac{(D_{output}^{MAX} - D_{inflection})(D - D_{inflection})}{D_{clipping} - D_{inflection}} & \text{if } D_{inflection} < D \leq D_{clipping} \\ D_{output}^{MAX} & D_{clipping} < D \leq D_{input}^{MAX} \end{cases}$$

where D is the distance between the source color to map and the anchor point along the mapping line; $D_{input}^{MAX}$ is the maximum distance of the source color values, for example determined by the limits of CIE L*a*b* space; $D_{output}^{MAX}$ is the distance between the anchor point and the target gamut boundary along the mapping line.

This method has two parameters:

$D_{inflection}$ which is the distance where the first linear function (of slope one) stops and the middle segment begins, $D_{clipping}$ is the cut off value for clipping.

The mapping method according to this embodiment of the invention is now entirely defined by the definition of the different partitions in a L*C* mapping plane, the definition of the anchor points and of the mapping lines in this mapping plane, and the definition of the one-dimensional compression/extension functions along these mapping lines.

Figure 5:
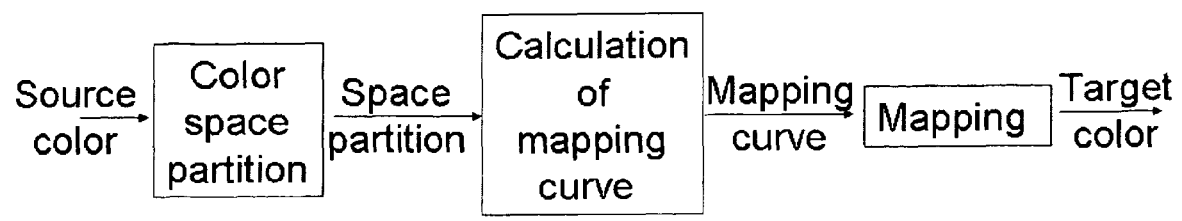
FIG. 5 summarizes the mapping method according to the embodiment of the invention which is illustrated by FIG. 1 to 4.

FIG. 5 summarizes the mapping method according to this embodiment of the invention that includes the following steps:

Color space partitioning, which divides the color space into at least two parts, the first part with priority in contrast preservation and the second part with priority in saturation preservation.

For each given source color belonging to a source gamut and being in one of the said parts of the color space, an anchor point is calculated such that said source color and its anchor point belong to a mapping line and such that other source colors belonging to said mapping curve use the same mapping curve;

Aligning mapping lines of source colors in a way that the gradient of the lines and its first derivative are a smooth function of the source colors in the color space;

Each said source color is mapped along its mapping line onto a destination color belonging to a target gamut;

Determining the moved distance of said source color along its mapping curve according to an unidirectional mapping function that considers at least one of the source and the target gamuts.

According to the invention, as the gradients along the uniformity testing curve and the first derivation of these gradients along the uniformity testing curve are continuous, a so-called "smooth behavior" is obtained. It can thus be appreciated that the present invention improves upon the prior art by providing a uniform gamut mapping method. Continuity of gradients of mapping trajectories along the uniformity testing curve, and the continuity of their first derivatives along the uniformity testing curve, are used as a criterion for this uniformity, because the continuity of these gradients and the continuity of their first derivatives indicate whether the mapping trajectory is steep or flat at the source colors to be mapped.

The invention is independent from the choice of the mapping color space. XYZ, Lab or JCh are examples of mapping color space. The invention is independent of the gamut boundary descriptors that are used to represent the source color gamut or the target color gamut. The invention is independent of the compression/extension algorithms that are used to map the source colors along their mapping trajectories.

It will be understood that the present invention has been described purely by way of example, and modifications of detail can be made without departing from the scope of the invention. While the present invention is described with respect to the above described embodiment, it is understood that the present invention is not limited to this embodiment. The present invention as claimed therefore includes variations from this embodiment described herein, as will be apparent to one of skill in the art. While some of the specific embodiments may be described and claimed separately, it is understood that the various features of embodiments described and claimed herein may be used in combination.

The invention claimed is:

1. A method of mapping, in a color space, source colors of a source color device into target colors of a target color device, said method comprising steps of:

mapping each said source color into a corresponding said target color along a mapping trajectory that is anchored to an anchor point, wherein there is at least one mapping plane comprising different anchor points and different mapping trajectories that do not intersect one with another except, possibly, at one of said anchor points, wherein said at least one mapping plane is partitioned into a plurality of different parts comprising a first part, a second part and a third part such that said second part is positioned between said first and third parts, and further wherein variable anchor points are used in said second part and fixed anchor points are used in said first and third parts; and defining said different mapping trajectories in said at least one mapping plane such that, in said at least one mapping plane, a uniformity testing curve different from an achromatic axis can be found that intersects all of said different mapping trajectories such that a function defined by a variation, along said uniformity testing curve, of gradients of said different mapping trajectories at said intersections is continuous, and such that a first derivation of said function along said uniformity testing curve is also continuous.

2. The method according to claim 1, wherein at least one of said plurality of different parts has priority in contrast preservation, and at least another one of said plurality of different parts has priority in saturation preservation.

3. The method according to claim 1, wherein each of said gradients of said different mapping trajectories at said intersections with the uniformity testing curve is defined as a value of the first derivation of a function describing, in an associated mapping plane, a mapping trajectory at the intersection of said mapping trajectory with said uniformity testing curve.

* * * * *